US012739763B2

(12) United States Patent
Liu et al.

(10) Patent No.: US 12,739,763 B2
(45) Date of Patent: Sep. 15, 2026

(54) ESTABLISHING A RELAY CONNECTION FOR AN OUT-OF-COVERAGE (OOC) SIDELINK (SL) USER EQUIPMENT (UE)

(71) Applicant: QUALCOMM Incorporated, San Diego, CA (US)

(72) Inventors: Chih-Hao Liu, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 355 days.

(21) Appl. No.: 18/468,026

(22) Filed: Sep. 15, 2023

(65) Prior Publication Data

US 2025/0097865 A1 Mar. 20, 2025

(51) Int. Cl.

| | |
|---|---|
| ***H04W 56/00*** | (2009.01) |
| ***H04W 48/12*** | (2009.01) |
| ***H04W 76/10*** | (2018.01) |
| ***H04W 76/14*** | (2018.01) |
| ***H04W 76/16*** | (2018.01) |
| ***H04W 88/04*** | (2009.01) |
| ***H04W 92/18*** | (2009.01) |

(52) U.S. Cl.

CPC ....... *H04W 56/0015* (2013.01); *H04W 76/10* (2018.02)

(58) Field of Classification Search

None

See application file for complete search history.

(56) References Cited

U.S. PATENT DOCUMENTS

| | | | | |
|---|---|---|---|---|
| 2021/0368460 | A1 | 11/2021 | Fakoorian et al. | |
| 2022/0210747 | A1 | 6/2022 | Lee et al. | |
| 2022/0232497 | A1* | 7/2022 | Ko | H04J 11/00 |
| 2023/0042690 | A1 | 2/2023 | Ko et al. | |
| 2023/0124916 | A1* | 4/2023 | Lindholm | H04W 56/002 370/329 |
| 2024/0179726 | A1* | 5/2024 | Wang | H04W 72/25 |
| 2025/0220598 | A1* | 7/2025 | Paz | H04W 56/001 |

OTHER PUBLICATIONS

International Search Report and Written Opinion—PCT/US2024/046482—ISA/EPO—Feb. 24, 2025.

3GPP TS 23.303: "3rd Generation Partnership Project, Technical Specification Group Services and System Aspects, Proximity-based services (ProSe), Stage 2 (Release 17)", 3GPP Standard, Technical Specification, 3GPP TS 23.303 V17.1.0, 3rd Generation Partnership Project, Mobile Competence Centre, 650, Route Des Lucioles, F-06921 Sophia-Antipolis Cedex, France, vol. SA WG2, No. V17.1.0, Jun. 21, 2023, pp. 1-131, XP052408937, paragraph [05.3].

Partial International Search Report—PCT/US2024/046482—ISA/EPO—Feb 1, 2025.

* cited by examiner

*Primary Examiner* — Jenee Holland

(74) *Attorney, Agent, or Firm* — Seyfarth Shaw LLP

(57) ABSTRACT

A method for wireless communication at a relay user equipment (UE) includes receiving, from a network node, a first message indicating one or more parameters associated with a relay synchronization signal block (SSB). The method also includes receiving, from the network node, a second message instructing the relay UE to transmit the relay SSB in accordance with the one or more parameters. The method further includes transmitting, to one or more out-of-coverage (OOC) sidelink (SL) UEs via an SL channel, a third message including the relay SSB in accordance with receiving the second message.

12 Claims, 10 Drawing Sheets

100
EPC
160
HSS
174
Other MMEs
164
MME
162
MBMS GW
168
Serving Gateway
166
BM-SC
170
PDN Gateway
172
IP Services
176
UDM
196
Core Network
190
Other AMFs
193
AMF
192
SMF
194
UPF
195
IP Services
197
Relay Component
199
132
184
102
104
110
110 (110')
102 (102')
102/180
120
134
150
152
154
158
182
182'
182''

Figure 10:
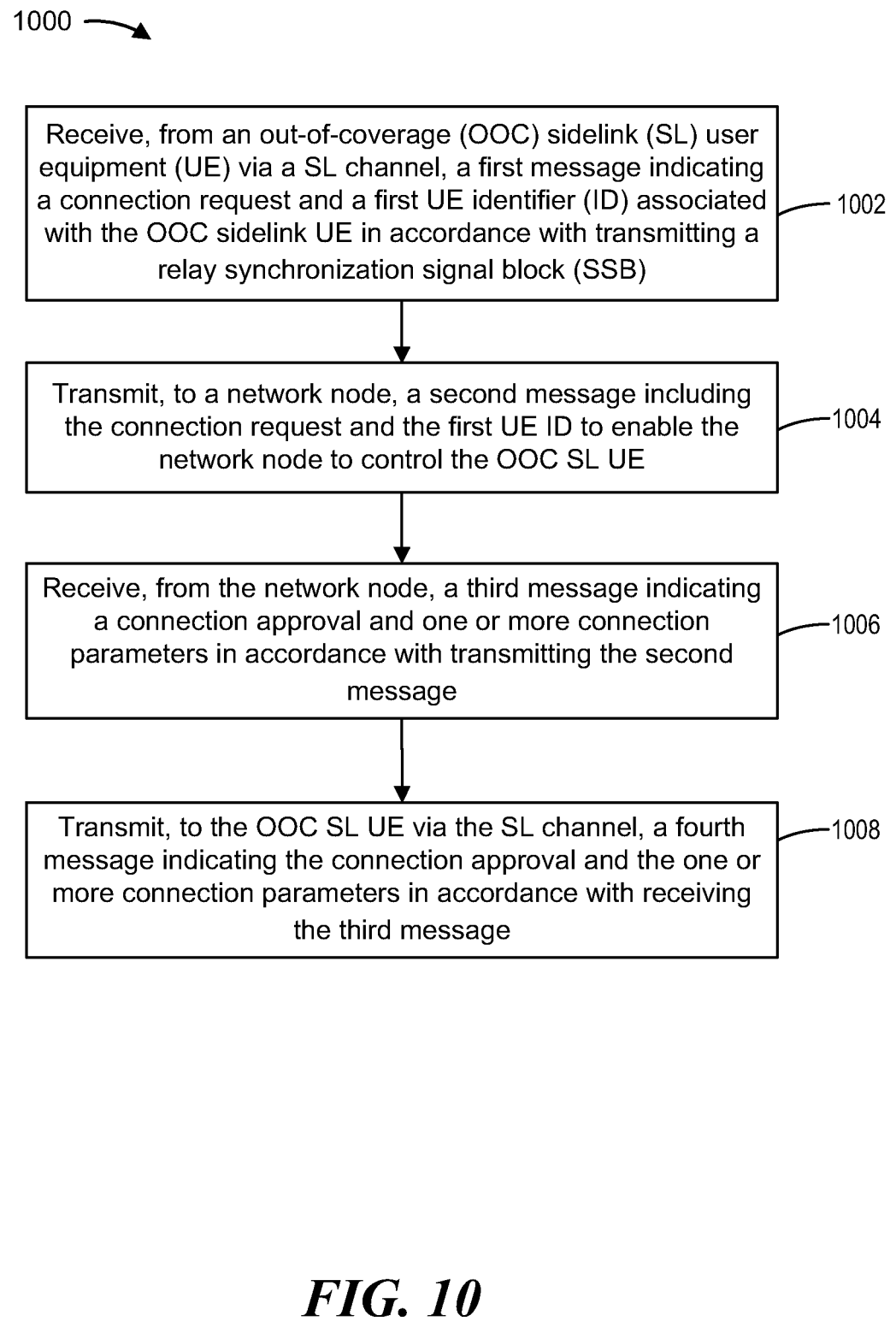

Receive, from an out-of-coverage (OOC) sidelink (SL) user equipment (UE) via a SL channel, a first message indicating a connection request and a first UE identifier (ID) associated with the OOC sidelink UE in accordance with transmitting a relay synchronization signal block (SSB)

1002

Transmit, to a network node, a second message including the connection request and the first UE ID to enable the network node to control the OOC SL UE

1004

Receive, from the network node, a third message indicating a connection approval and one or more connection parameters in accordance with transmitting the second message

1006

Transmit, to the OOC SL UE via the SL channel, a fourth message indicating the connection approval and the one or more connection parameters in accordance with receiving the third message

ESTABLISHING A RELAY CONNECTION FOR AN OUT-OF-COVERAGE (OOC) SIDELINK (SL) USER EQUIPMENT (UE)

FIELD OF THE DISCLOSURE

The present disclosure relates generally to wireless communications, and more specifically to establishing a relay connection for an out-of-coverage (OOC) sidelink (SL) user equipment (UE).

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunications standards to provide a common protocol that enables different wireless devices to communicate on a municipal, national, regional, and even global level. An example telecommunications standard is fifth generation (5G) new radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the fourth generation (4G) long term evolution (LTE) standard. Narrowband (NB)-IoT and enhanced machine-type communications (eMTC) are a set of enhancements to LTE for machine type communications. There exists a need for further improvements in 5G NR technology. These improvements may also be applicable to other multi-access technologies and the telecommunications standards that employ these technologies.

Wireless communications systems may include or provide support for various types of communications systems, such as sidelink communications systems. In such examples, sidelink user equipment (UEs), such as vehicles, may communicate directly with each other using device-to-device (D2D) communications over a D2D wireless link. These communications can be referred to as sidelink communications.

Some wireless communication networks may rely on one or more relay nodes to relay communications between a network node and a UE. Some relay networks include three different types of nodes that facilitate effective communication and data transmission. These nodes include a network node, such as a base station, a relay UE, and a non-relay UE (also referred to as a relayed UE). In some examples, a non-relay UE may be an example of an out-of-coverage (OOC) UE that is outside of a coverage area associated with the network node. In most conventional wireless communication networks, a network node may be unable to establish a relay connection with an OOC UE.

SUMMARY

In one aspect of the present disclosure, a method for wireless communication at a relay user equipment (UE) includes receiving, from a network node, a first message indicating one or more parameters associated with a relay synchronization signal block (SSB). The method further includes receiving, from the network node, a second message instructing the relay UE to transmit the relay SSB in accordance with the one or more parameters. The method also includes transmitting, to one or more out-of-coverage (OOC) sidelink (SL) UEs via an SL channel, a third message including the relay SSB in accordance with receiving the second message.

Another aspect of the present disclosure is directed to an apparatus including means for receiving, from a network node, a first message indicating one or more parameters associated with a relay SSB. The apparatus also includes means for receiving, from the network node, a second message instructing the relay UE to transmit the relay SSB in accordance with the one or more parameters. The apparatus further includes means for transmitting, to one or more OOC SL UEs via an SL channel, a third message including the relay SSB in accordance with receiving the second message.

In another aspect of the present disclosure, a non-transitory computer-readable medium with non-transitory program code recorded thereon is disclosed. The program code is executed by one or more processors and includes program code to receive, from a network node, a first message indicating one or more parameters associated with a relay SSB. The program code further includes program code to receive, from the network node, a second message instructing the relay UE to transmit the relay SSB in accordance with the one or more parameters. The program code also includes program code to transmit, to one or more OOC SL UEs via an SL channel, a third message including the relay SSB in accordance with receiving the second message.

Another aspect of the present disclosure is directed to a relay UE including one or more processors, and one or more memories coupled with the one or more processors and storing processor-executable code that, when executed by the one or more processors, is configured to cause the relay UE to receive, from a network node, a first message indicating one or more parameters associated with a relay SSB. Execution of the processor-executable code also causes the relay UE to receive, from the network node, a second message instructing the relay UE to transmit the relay SSB in accordance with the one or more parameters. Execution of the processor-executable code further causes the relay UE to transmit, to one or more OOC SL UEs via an SL channel, a third message including the relay SSB in accordance with receiving the second message.

In one aspect of the present disclosure, a method for wireless communication at a relay UE includes receiving, from an OOC SL UE via an SL channel, a first message indicating a connection request and a first UE ID associated with the OOC sidelink UE in accordance with transmitting a relay SSB. The method further includes transmitting, to a network node, a second message including the connection request and the first UE ID to enable the network node to control the OOC SL UE. The method also includes receiving, from the network node, a third message indicating a connection approval and one or more connection parameters in accordance with transmitting the second message. The method further includes transmitting, to the OOC SL UE via the SL channel, a fourth message indicating the connection approval and the one or more connection parameters in accordance with receiving the third message.

Another aspect of the present disclosure is directed to an apparatus including means for receiving, from an OOC SL UE via an SL channel, a first message indicating a connection request and a first UE ID associated with the OOC sidelink UE in accordance with transmitting a relay SSB. The apparatus further includes means for transmitting, to a network node, a second message including the connection request and the first UE ID to enable the network node to control the OOC SL UE. The apparatus also includes means for receiving. from the network node, a third message indicating a connection approval and one or more connection parameters in accordance with transmitting the second message. The apparatus further includes means for transmitting, to the OOC SL UE via the SL channel, a fourth message indicating the connection approval and the one or more connection parameters in accordance with receiving the third message.

In another aspect of the present disclosure, a non-transitory computer-readable medium with non-transitory program code recorded thereon is disclosed. The program code is executed by one or more processors and includes program code to receive, from an OOC SL UE via an SL channel, a first message indicating a connection request and a first UE ID associated with the OOC sidelink UE in accordance with transmitting a relay SSB. The program code also includes program code to transmit, to a network node, a second message including the connection request and the first UE ID to enable the network node to control the OOC SL UE. The program code further includes program code to receive, from the network node, a third message indicating a connection approval and one or more connection parameters in accordance with transmitting the second message. The program code still further includes program code to transmit, to the OOC SL UE via the SL channel, a fourth message indicating the connection approval and the one or more connection parameters in accordance with receiving the third message.

Another aspect of the present disclosure is directed to a relay UE including one or more processors, and one or more memories coupled with the one or more processors and storing processor-executable code that, when executed by the one or more processors, is configured to receive, from an OOC SL UE via an SL channel, a first message indicating a connection request and a first UE ID associated with the OOC sidelink UE in accordance with transmitting a relay SSB. Execution of the processor-executable code also causes the relay UE to transmit, to a network node, a second message including the connection request and the first UE ID to enable the network node to control the OOC SL UE. Execution of the processor-executable code further causes the relay UE to receive, from the network node, a third message indicating a connection approval and one or more connection parameters in accordance with transmitting the second message. Execution of the processor-executable code also still further causes the relay UE to transmit, to the OOC SL UE via the SL channel, a fourth message indicating the connection approval and the one or more connection parameters in accordance with receiving the third message.

Aspects generally include a method, apparatus, system, computer program product, non-transitory computer-readable medium, user equipment, network node, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8 is an example of a timing diagram illustrating an example of establishing a connection between a network node and an OOC SL UE, via a relay UE, in accordance with various aspects of the present disclosure.

FIG. 10 is a flow diagram illustrating an example of a process for establishing a relay connection with an OOC SL UE, in accordance with various aspects of the present disclosure.

DETAILED DESCRIPTION

Figure 1:
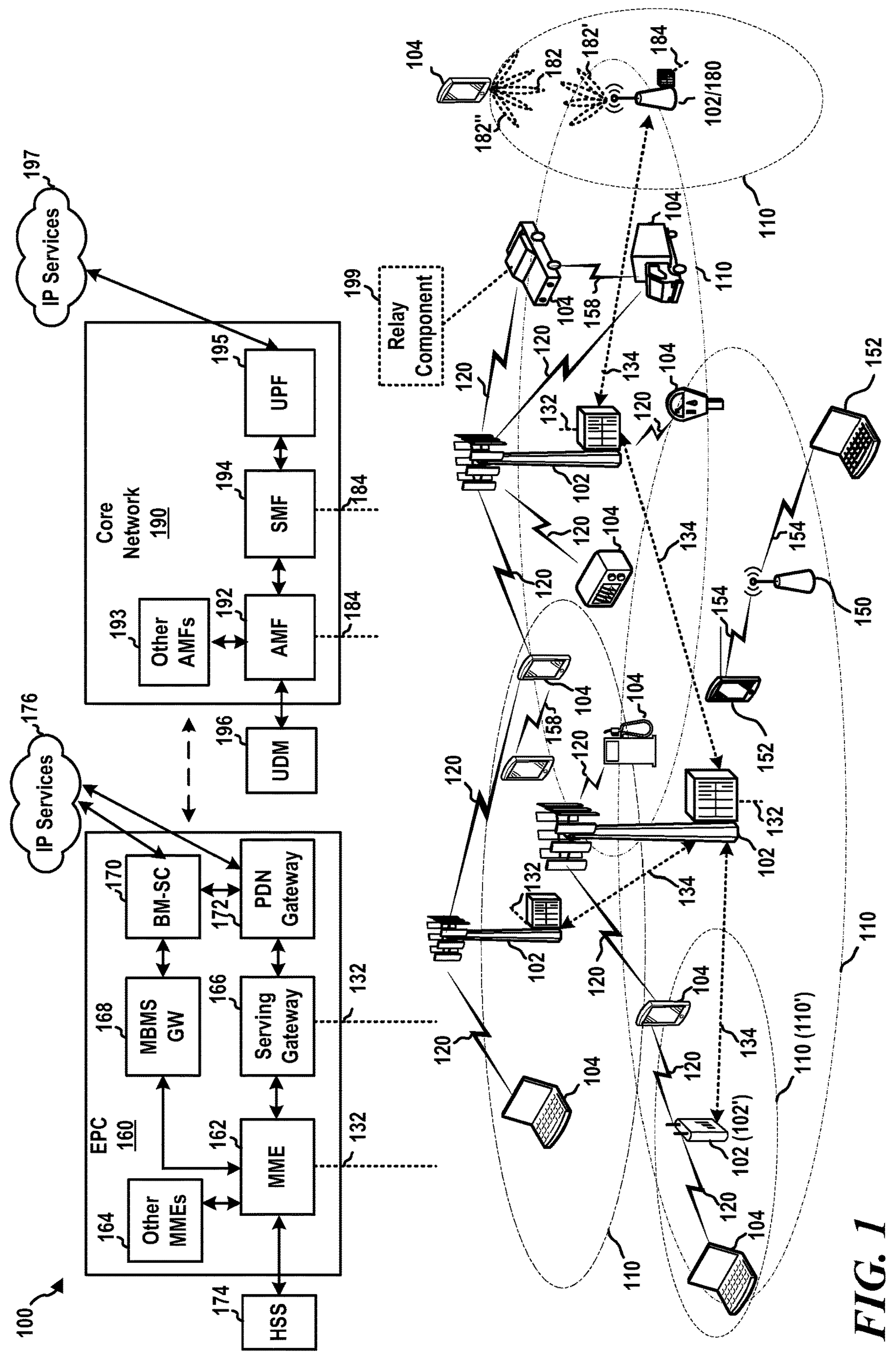
FIG. 1 is a diagram illustrating an example of a wireless communications system and an access network.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure disclosed, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology associated with 5G wireless technologies, aspects of the present disclosure can be applied in later generations, including for 6G wireless technologies, or in other wireless communications systems.

In cellular communications networks, wireless devices may generally communicate with each other via access links with one or more network entities such as a base station or scheduling entity. Some cellular networks may also support device-to-device (D2D) communications that enable discovery of, and communications among, nearby devices using direct links between devices (for example, without passing through a base station, relay, or other network entity). D2D communications may also be referred to as point-to-point (P2P) or sidelink communications. D2D communications may be implemented using licensed or unlicensed bands. Using D2D communications, devices can avoid some of the overhead that would otherwise be involved with routing to and from a network entity. D2D communications can also enable mesh networking and device-to-network relay functionality.

Sidelink (SL) communication is an example of D2D communication that enables a user equipment (UE) to communicate with another UE without tunneling through a base station and/or a core network. Sidelink communications can be communicated over a physical sidelink control channel (PSCCH) and a physical sidelink shared channel (PSSCH). The PSCCH and PSSCH are similar to a physical downlink control channel (PDCCH) and a physical downlink shared channel (PDSCH) in downlink (DL) communications between a network node and a UE. For instance, the PSCCH may carry sidelink control information (SCI) and the PSCCH may carry sidelink data (for example, user data). Each PSCCH is associated with a corresponding PSSCH, where SCI in a PSCCH may carry reservation and/or scheduling information for a sidelink data transmission in the associated PSSCH. Use cases for sidelink communications may include, among others, V2X, industrial Internet of Things (IoT) (IIoT), and/or NR-lite.

In a wireless communication network, the term coverage generally refers to the geographical area where devices can receive wireless signals transmitted by a network node. An in-coverage UE refers to a UE that is within the geographical area covered by the signal from the network node, such that the in-coverage UE may directly communicate with the network node. An out-of-coverage (OOC) UE (e.g., OOC sidelink (SL) UE) refers to a UE that is outside the geographical area where the network node's signal can reach. The OOC UE cannot directly communicate with the network node due to a lack of signal or a weak signal. In such examples, an in-coverage UE may facilitate communications between the OOC UE and the network node. In some examples, the in-coverage UE and the OOC UE may communicate via a sidelink (SL) channel. In such examples, the OOC UE may be an OOC SL UE and the in-coverage UE may be an SL relay UE.

Various aspects of the present disclosure are directed to establishing a relay connection between a network node and one or more OOC SL UEs via one or more SL relay UEs. For ease of explanation, the SL relay UE may be referred to as a relay UE. In some examples, a relay UE receives, from a network node, a first message including one or more parameters associated with a relay synchronization signal block (SSB). The one or more parameters may be SSB parameters. Additionally, the one or more parameters include a relay pattern for the relay SSB. The relay pattern may be the same pattern as a network pattern associated with a network SSB. In such examples, the relay UE may receive a second message instructing the relay UE to transmit the relay SSB in accordance with the one or more parameters. The UE may transmit the relay SSB to extend a coverage area associated with the network node. The relay UE may then transmit, to one or more OOC SL UEs, a third message including the relay SSB, in accordance with receiving the second message. The relay UE may receive, from an OOC SL UE of the one or more OOC SL UEs, a connection request in accordance with transmitting the relay SSB. In some examples, the relay UE may also transmit, to the one or more OOC SL UEs, message indicating a synchronization priority via at least one of: a primary synchronization signal (PSS), a secondary synchronization signal (SSS), or a physical sidelink broadcast channel (PSBCH). The synchronization priority may indicate a distance between the relay UE and the network node. In some such examples, the relay UE may receive the connection request in accordance with indicating the synchronization priority. In some examples, the relay UE may receive, from the network node, a message configuring an initial SL bandwidth part (BWP) and an SL resource pool for establishing the SL channel with the one or more OOC SL UEs. In such examples, the relay UE may forward the initial SL BWP and the SL resource pool to the one or more OOC SL UEs, such that the OOC SL UEs may establish the SL channel with the relay UE.

As discussed, in some examples, the SL UE may receive, from an OOC SL UE, the connection request in accordance with transmitting the relay SSB. In some examples, the relay UE also receives, from the OOC SL UE, a message indicating a first UE ID that uniquely identifies the OOC SL UE. In some examples, the message may be sidelink control information (SCI) or a medium access control (MAC)-control element (CE) (MAC-CE) associated with the connection request. The relay UE may forward, to the network node, the connection request and the first UE ID. The network node may use the first UE ID to control the OOC SL UE, in addition to communicating with the OOC SL UE via the relay UE. In some examples, the first UE ID may be a pre-configured UE ID or a temporary UE ID. The relay UE may receive, from the network node, a message including a connection approval and a second UE ID in accordance with the relay UE forwarding the connection request from the OOC SL UE. The second UE ID may be used to indicate that the OOC SL UE is the intended recipient of the connection approval. In some examples, the second UE ID is the same as the first UE ID when the first UE ID is pre-configured. In other examples, the second ID is different than the first UE ID when the first UE ID is temporary. In such example, the second UE ID may be assigned to the OOC SL UE.

Particular aspects of the subject matter described in this disclosure can be implemented to realize one or more of the following potential advantages. In some examples, the described techniques of a relay UE receiving, from the network node, the one or more parameters associated with a relay SSB and instructions to transmit the relay SSB may facilitate extending the coverage area of the network node. Specifically, in such examples, a relay UE may transmit a connection request in accordance with receiving the relay SSB, thus allowing the network node to communicate with, and control, one or more OOC SL UEs that are otherwise outside the network node's coverage area. Additionally, the described techniques of the relay UE receiving the initial SL-BWP and the resource pool allow the network node to control SL frequency domain resources, such that the network node may coordinate SL resources among one or more UEs, thereby improving overall network efficiency. Furthermore, in a multi-hop relay network, the synchronization priority may be used by the OOC SL UE to identify a distance between the relay UE and the network node, thereby allowing the OOC SL UE to select a closest relay UE to the network node. Selecting the closest relay UE may reduce latency and improve network performance. Finally, the described techniques of the relay UE receiving a first UE ID form the OOC SL UE and forwarding, to the network node, the UE ID associated with the OOC SL UE allow the network node and the relay UE to distinguish the OOC SL UE from other OOC SL UEs. Thus allowing the network node to extend its coverage area to multiple OOC SL UEs. Furthermore, the UE ID may be used in a multi-hop relay network to establish a unique route to the OOC SL UE.

FIG. 1 is a diagram illustrating an example of a wireless communications system and an access network 100. The wireless communications system (also referred to as a wireless wide area network (WWAN)) includes base stations 102, UEs 104, an evolved packet core (EPC) 160, and another core network 190 (e.g., a 5G core (5GC)). The base stations 102 may include macrocells (high power cellular base station) and/or small cells 102' (low power cellular base station). The macrocells include base stations. The small cells 102' include femtocells, picocells, and microcells.

The base stations 102 configured for 4G LTE (collectively referred to as evolved universal mobile telecommunications system (UMTS) terrestrial radio access network (E-UTRAN)) may interface with the EPC 160 through backhaul links 132 (e.g., S1 interface). The base stations 102 configured for 5G NR (collectively referred to as next generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communications coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include home evolved Node Bs (eNBs) (HeNBs), which may provide service to a restricted group known as a closed subscriber group (CSG). The communications links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communications links 120 may use multiple-input and multiple-output (MIMO) antenna technology, including spatial multiplexing, beamforming, and/or transmit diversity. The communications links may be through one or more carriers. The base stations 102/UEs 104 may use spectrum up to Y MHz (e.g., 5, 10, 15, 20, 100, 400, etc., MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communications link 158. The D2D communications link 158 may use the DL/UL WWAN spectrum. The D2D communications link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communications may be through a variety of wireless D2D communications systems, such as FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communications links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include a NR BS, a Node B, a 5G node B, an eNB, a gNodeB (gNB), an access point, a transmit and receive point (TRP), a network node, a network entity, and/or the like. A base station can be implemented as an aggregated network node, as a disaggregated network node, an integrated access and backhaul (IAB) node, a relay node, a sidelink node, etc. The base station can be implemented in an aggregated or monolithic base station architecture, or alternatively, in a disaggregated network node architecture, and may include one or more of a central unit (CU), a distributed unit (DU), a radio unit (RU), a near-real time (near-RT) RAN intelligent controller (RIC), or a non-real time (non-RT) RIC. Some base stations, such as gNB 180 may operate in a traditional sub 6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave. Communications using the mmWave/near mm Wave radio frequency band (e.g., 3 GHz-300 GHz) has extremely high path loss and a short range. The mmWave base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a mobility management entity (MME) 162, other MMEs 164, a serving gateway 166, a multimedia broadcast multicast service (MBMS) gateway 168, a broadcast multicast service center (BM-SC) 170, and a packet data network (PDN) gateway 172. The MME 162 may be in communication with a home subscriber server (HSS) 174. The MME 162 is the control node that processes the signaling between the UEs 104 and the EPC 160. Generally, the MME 162 provides bearer and connection management. All user Internet protocol (IP) packets are transferred through the serving gateway 166, which itself is connected to the PDN gateway 172. The PDN gateway 172 provides UE IP address allocation as well as other functions. The PDN gateway 172 and the BM-SC 170 are connected to the IP services 176. The IP services 176 may include the Internet, an intranet, an IP multimedia subsystem (IMS), a PS streaming service, and/or other IP services. The BM-SC 170 may provide functions for MBMS user service provisioning and delivery. The BM-SC 170 may serve as an entry point for content provider MBMS transmission, may be used to authorize and initiate MBMS bearer services within a public land mobile network (PLMN), and may be used to schedule MBMS transmissions. The MBMS gateway 168 may be used to distribute MBMS traffic to the base stations 102 belonging to a multicast broadcast single frequency network (MBSFN) area broadcasting a particular service, and may be responsible for session management (start/stop) and for collecting eMBMS related charging information.

The core network 190 may include an access and mobility management function (AMF) 192, other AMFs 193, a session management function (SMF) 194, and a user plane function (UPF) 195. The AMF 192 may be in communication with a unified data management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP services 197. The IP services 197 may include the Internet, an intranet, an IP multimedia subsystem (IMS), a PS streaming service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit and receive point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., a parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a receiving device, such as the UE 104, may receive sensing information from one or more other UEs 104. The UE 104 that received the sensing information may also obtain sensing information from its own measurements. The UE 104 may include a relay component 199 configured to perform one or more operations, such as one or more operations of the process 1000 or 1100 described with reference to FIGS. 10 and 11, respectively.

Although the following description may be focused on 5G NR, it may be applicable to other similar areas, such as LTE, LTE-A, CDMA, GSM, and other wireless technologies.

Figure 2:
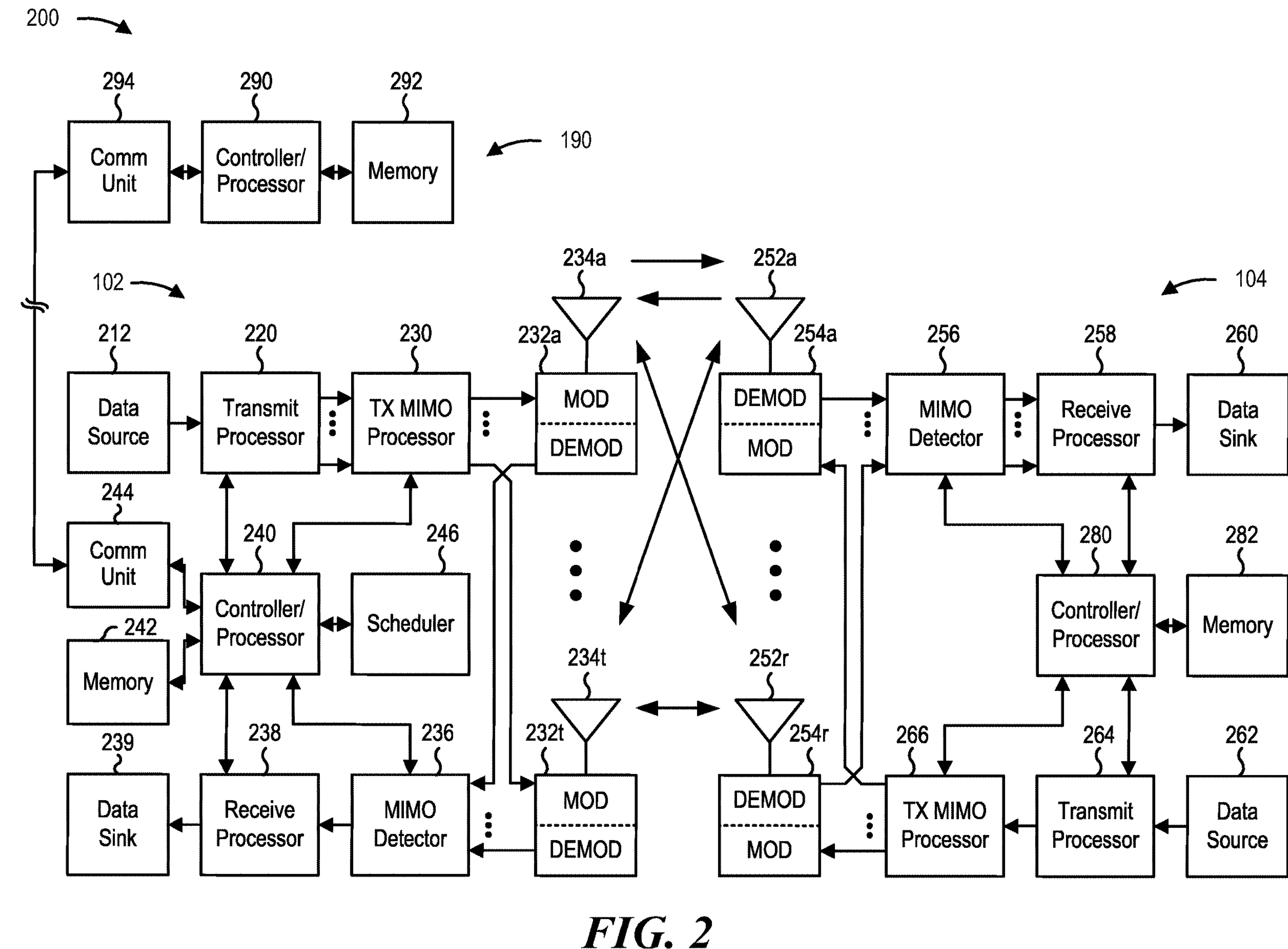
FIG. 2 is a block diagram conceptually illustrating an example of a network node in communication with a user equipment (UE) in a wireless communications network, in accordance with various aspects of the present disclosure.

FIG. 2 shows a block diagram of a design 200 of the base station 102 and UE 104, which may be one of the base stations and one of the UEs in FIG. 1, respectively. The base station 102 may be equipped with T antennas 234*a* through 234*t*, and UE 104 may be equipped with R antennas 252*a* through 252*r*, where in general T≥1 and R≥1.

At the base station 102, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. Decreasing the MCS lowers throughput but increases reliability of the transmission. The transmit processor 220 may also process system information (for example, for semi-static resource partitioning information (SRPI) and/or the like) and control information (for example, CQI requests, grants, upper layer signaling, and/or the like) and provide overhead symbols and control symbols. The transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (for example, for orthogonal frequency division multiplexing (OFDM) and/or the like) to obtain an output sample stream. Each modulator 232 may further process (for example, convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At the UE 104, antennas 252*a* through 252*r* may receive the downlink signals from the base station 102 and/or other base stations and may provide received signals to demodulators (DEMODs) 254*a* through 254*r*, respectively. Each demodulator 254 may condition (for example, filter, amplify, downconvert, and digitize) a received signal to obtain input samples. Each demodulator 254 may further process the input samples (for example, for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (for example, demodulate and decode) the detected symbols, provide decoded data for the UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 104 may be included in a housing.

On the uplink, at the UE 104, a transmit processor 264 may receive and process data from a data source 262 and control information (for example, for reports comprising RSRP, RSSI, RSRQ, CQI, and/or the like) from the controller/processor 280. The transmit processor 264 may also generate reference symbols for one or more reference signals. The symbols from the transmit processor 264 may be precoded by a TX MIMO processor 266 if applicable, further processed by modulators 254*a* through 254*r* (for example, for discrete Fourier transform spread (DFT-s)-OFDM, CP-OFDM, and/or the like), and transmitted to the base station 102. At the base station 102, the uplink signals from the UE 104 and other UEs may be received by the antennas 234, processed by the demodulators 254, detected by a MIMO detector 236 if applicable, and further processed by a receive processor 238 to obtain decoded data and control information sent by the UE 104. The receive processor 238 may provide the decoded data to a data sink 239 and the decoded control information to a controller/processor 240. The base station 102 may include communications unit 244 and communicate to the core network 190 via the communications unit 244. The core network 190 may include a communications unit 294, a controller/processor 290, and a memory 292.

The controller/processor 240 of the base station 102, the controller/processor 280 of the UE 104, and/or any other component(s) of FIG. 2 may perform one or more techniques associated with configuring a relay-based sidelink network as described in more detail elsewhere. For example, the controller/processor 240 of the base station 102, the controller/processor 280 of the UE 104, and/or any other component(s) of FIG. 2 may perform or direct operations of, for example, the processes of FIGS. 10 and 12 and/or other processes as described. Memories 242 and 282 may store data and program codes for the base station 102 and UE 104, respectively. A scheduler 246 may schedule UEs for data transmission on the downlink and/or uplink.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a network node (such as a Node B (NB), an evolved NB (eNB), an NR BS, 5G NB, an access point (AP), a transmit and receive point (TRP), or a cell, etc.) may be implemented as an aggregated network node (also known as a standalone network node or a monolithic network node) or a disaggregated network node.

An aggregated network node may be configured to utilize a radio protocol stack that is physically or logically integrated within a single RAN node. A disaggregated network node may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes.

The DUs may be implemented to communicate with one or more RUs. Each of the CU, DU, and RU also can be implemented as virtual units (for example, a virtual central unit (VCU), a virtual distributed unit (VDU), or a virtual radio unit (VRU)).

Network node-type operations or network designs may consider aggregation characteristics of network node functionality. For example, disaggregated network nodes may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated network node, or disaggregated RAN architecture, can be configured for wired or wireless communication with at least one other unit.

At least one of the transmit processor 264, the receive processor 258, and the controller/processor 280 may be configured to perform aspects in connection with the relay component 199 of FIG. 1.

In some aspects, the base station 102 and/or the UE 104 may include means for performing one or more operations, such as one or more operations of the process 1000 or 1100 described with reference to FIGS. 10 and 11, respectively.

Figure 3:
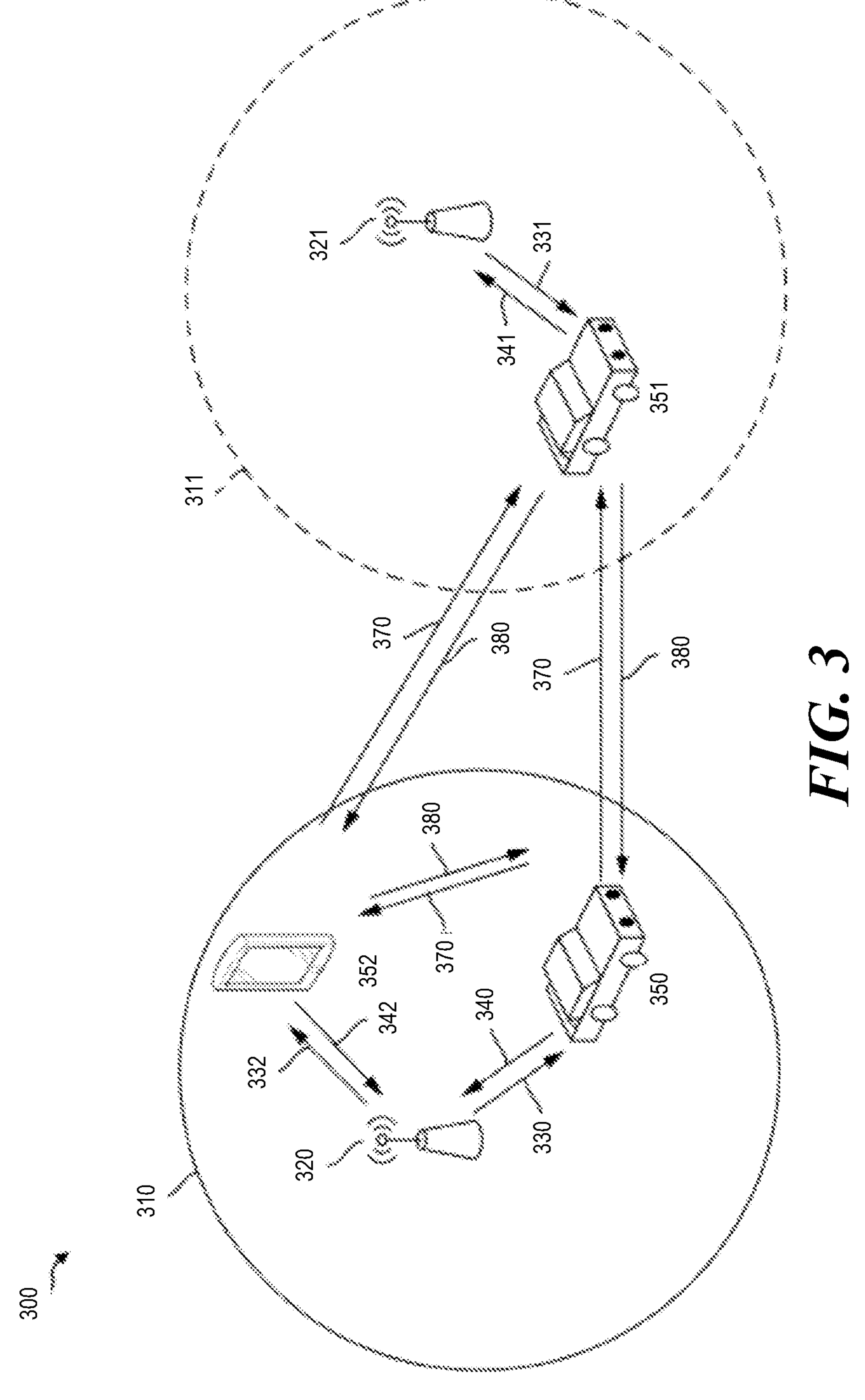
FIG. 3 is a diagram illustrating an example of a vehicle-to-everything (V2X) system, in accordance with various aspects of the present disclosure.

FIG. 3 is a diagram of a device-to-device (D2D) communications system 300, including V2X communications, in accordance with various aspects of the present disclosure. For example, the D2D communications system 300 may include V2X communications, (e.g., a first UE 350 communicating with a second UE 351). In some aspects, the first UE 350 and/or the second UE 351 may be configured to communicate in a licensed radio frequency spectrum and/or a shared radio frequency spectrum. The shared radio frequency spectrum may be unlicensed, and therefore multiple different technologies may use the shared radio frequency spectrum for communications, including new radio (NR), LTE, LTE-Advanced, licensed assisted access (LAA), dedicated short range communications (DSRC), MuLTEFire, 3G, and the like. The foregoing list of technologies is to be regarded as illustrative, and is not meant to be exhaustive.

The D2D communications system 300 may use NR radio access technology. Of course, other radio access technologies, such as LTE radio access technology, may be used. In D2D communications (e.g., V2X communications or vehicle-to-vehicle (V2V) communications), the UEs 350, 351 may be on networks of different mobile network operators (MNOs). Each of the networks may operate in its own radio frequency spectrum. For example, the air interface to a first UE 350 (e.g., Uu interface) may be on one or more frequency bands different from the air interface of the second UE 351. The first UE 350 and the second UE 351 may communicate via a sidelink component carrier, for example, via the PC5 interface. In some examples, the MNOs may schedule sidelink communications between or among the UEs 350, 351 in licensed radio frequency spectrum and/or a shared radio frequency spectrum (e.g., 5 GHz radio spectrum bands).

The shared radio frequency spectrum may be unlicensed, and therefore different technologies may use the shared radio frequency spectrum for communications. In some aspects, a D2D communications (e.g., sidelink communications) between or among UEs 350, 351 is not scheduled by MNOs. The D2D communications system 300 may further include a third UE 352.

The third UE 352 may operate on the first network 310 (e.g., of the first MNO) or another network, for example. The third UE 352 may be in D2D communications with the first UE 350 and/or second UE 351. The first network node 320 may communicate with the third UE 352 via a downlink (DL) carrier 332 and/or an uplink (UL) carrier 342. The DL communications may use various DL resources (e.g., DL subframes and/or DL channels). The UL communications may be performed via the UL carrier 332 using various UL resources (e.g., UL subframes and/or UL channels).

The first network 310 operates in a first frequency spectrum and includes the first network node 320 communicating at least with the first UE 350, for example, as described in FIGS. 1-3. The first network node 320 (e.g., gNB) may communicate with the first UE 350 via a DL carrier 330 and/or an UL carrier 340. The DL communications may use various DL resources (e.g., DL subframes and/or DL channels). The UL communications may be performed via the UL carrier 330 using various UL resources (e.g., UL subframes and/or UL channels).

In some aspects, the second UE 351 may be on a different network from the first UE 350. In some aspects, the second UE 351 may be on a second network 311 (e.g., of the second MNO). The second network 311 may operate in a second frequency spectrum (e.g., a second frequency spectrum different from the first frequency spectrum) and may include the second network node 321 (e.g., gNB) communicating with the second UE 351, for example, as described in FIGS. 1-3.

The second network node 321 may communicate with the second UE 351 via a DL carrier 331 and an UL carrier 341. The DL communications are performed via the DL carrier 331 using various DL resources (e.g., DL subframes and/or DL channels). The UL communications are performed via the UL carrier 341 using various UL resources (e.g., UL subframes and/or UL channels).

In conventional systems, the first network node 320 and/or the second network node 321 assign resources to the UEs for device-to-device (D2D) communications (e.g., V2X communications and/or V2V communications). For example, the resources may be a pool of UL resources, both orthogonal (e.g., one or more frequency division multiplexing (FDM) channels) and non-orthogonal (e.g., code division multiplexing (CDM)/resource spread multiple access (RSMA) in each channel). The first network node 320 and/or the second network node 321 may configure the resources via the PDCCH (e.g., faster approach) or RRC (e.g., slower approach).

In some systems, each UE 350, 351 autonomously selects resources for D2D communications. For example, each UE 350, 351 may sense and analyze channel occupation during the sensing window. The UEs 350, 351 may use the sensing information to select resources from the sensing window. As discussed, one UE 351 may assist another UE 350 in performing resource selection. The UE 351 providing assistance may be referred to as the receiver UE or partner UE, which may potentially notify the transmitter UE 350. The transmitter UE 350 may transmit information to the receiving UE 351 via sidelink communications.

The D2D communications (e.g., V2X communications and/or V2V communications) may be carried out via one or more sidelink carriers 370, 380. The one or more sidelink carriers 370, 380 may include one or more channels, such as a physical sidelink broadcast channel (PSBCH), a physical sidelink discovery channel (PSDCH), a physical sidelink shared channel (PSSCH), and a physical sidelink control channel (PSCCH), for example.

In some examples, the sidelink carriers 370, 380 may operate using the PC5 interface. The first UE 350 may transmit to one or more (e.g., multiple) devices, including to the second UE 351 via the first sidelink carrier 370. The second UE 351 may transmit to one or more (e.g., multiple) devices, including to the first UE 350 via the second sidelink carrier 380.

In some aspects, the UL carrier 330 and the first sidelink carrier 370 may be aggregated to increase bandwidth. In some aspects, the first sidelink carrier 370 and/or the second sidelink carrier 380 may share the first frequency spectrum (with the first network 310) and/or share the second frequency spectrum (with the second network 311). In some aspects, the sidelink carriers 370, 380 may operate in an unlicensed/shared radio frequency spectrum.

In some aspects, sidelink communications on a sidelink carrier may occur between the first UE 350 and the second UE 351. In an aspect, the first UE 350 may perform sidelink communications with one or more (e.g., multiple) devices, including the second UE 351 via the first sidelink carrier 370. For example, the first UE 350 may transmit a broadcast transmission via the first sidelink carrier 370 to the multiple devices (e.g., the second and third UEs 351, 352). The second UE 351 (e.g., among other UEs) may receive such broadcast transmission. Additionally or alternatively, the first UE 350 may transmit a multicast transmission via the first sidelink carrier 370 to the multiple devices (e.g., the second and third UEs 351, 352). The second UE 351 and/or the third UE 352 (e.g., among other UEs) may receive such multicast transmission. The multicast transmissions may be connectionless or connection-oriented. A multicast transmission may also be referred to as a groupcast transmission.

Furthermore, the first UE 350 may transmit a unicast transmission via the first sidelink carrier 370 to a device, such as the second UE 351. The second UE 351 (e.g., among other UEs) may receive such unicast transmission. Additionally or alternatively, the second UE 351 may perform sidelink communications with one or more (e.g., multiple) devices, including the first UE 350 via the second sidelink carrier 380. For example, the second UE 351 may transmit a broadcast transmission via the second sidelink carrier 380 to the multiple devices. The first UE 350 (e.g., among other UEs) may receive such broadcast transmission.

In another example, the second UE 351 may transmit a multicast transmission via the second sidelink carrier 380 to the multiple devices (e.g., the first and third UEs 350, 352). The first UE 350 and/or the third UE 352 (e.g., among other UEs) may receive such multicast transmission. Further, the second UE 351 may transmit a unicast transmission via the second sidelink carrier 380 to a device, such as the first UE 350. The first UE 350 (e.g., among other UEs) may receive such unicast transmission. The third UE 352 may communicate in a similar manner.

In some aspects, for example, such sidelink communications on a sidelink carrier between the first UE 350 and the second UE 351 may occur without having MNOs allocating resources (e.g., one or more portions of a resource block (RB), slot, frequency band, and/or channel associated with a sidelink carrier 370, 380) for such communications and/or without scheduling such communications. Sidelink communications may include traffic communications (e.g., data communications, control communications, paging communications and/or system information communications). Further, sidelink communications may include sidelink feedback communications associated with traffic communications (e.g., a transmission of feedback information for previously-received traffic communications). Sidelink communications may employ at least one sidelink communications structure having at least one feedback symbol. The feedback symbol of the sidelink communications structure may allot for any sidelink feedback information that may be communicated in the device-to-device (D2D) communications system 300 between devices (e.g., a first UE 350, a second UE 351, and/or a third UE 352). As discussed, a UE may be a vehicle (e.g., UE 350, 351), a mobile device (e.g., 352), or another type of device. In some cases, a UE may be a special UE, such as a roadside unit (RSU).

Figure 4:
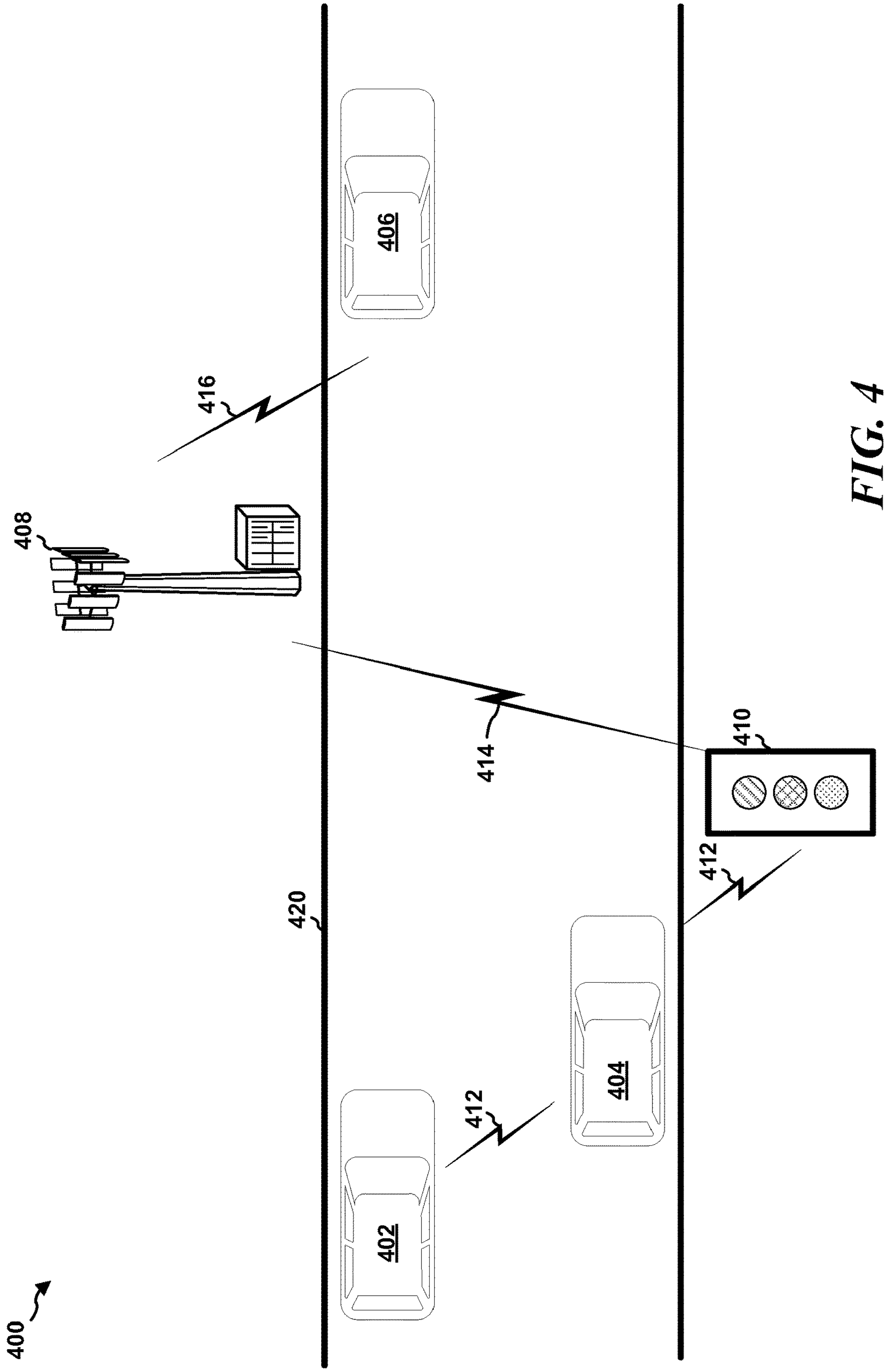
FIG. 4 is a block diagram illustrating an example of a vehicle-to-everything (V2X) system with a roadside unit (RSU), according to various aspects of the present disclosure.

FIG. 4 illustrates an example of a vehicle-to-everything (V2X) system with a roadside unit (RSU), according to aspects of the present disclosure. As shown in FIG. 4, V2X system 400 includes a transmitter UE 404 transmits data to an RSU 410 and a receiving UE 402 via sidelink transmissions 412. Additionally, or alternatively, the RSU 410 may transmit data to the transmitter UE 404 via a sidelink transmission 412. The RSU 410 may forward data received from the transmitter UE 404 to a cellular network (e.g., gNB) 408 via an UL transmission 414. The gNB 408 may transmit the data received from the RSU 410 to other UEs 406 via a DL transmission 416. The RSU 410 may be incorporated with traffic infrastructure (e.g., traffic light, light pole, etc.) For example, as shown in FIG. 4, the RSU 410 is a traffic signal positioned at a side of a road 420. Additionally or alternatively, RSUs 410 may be stand-alone units.

Figure 5:
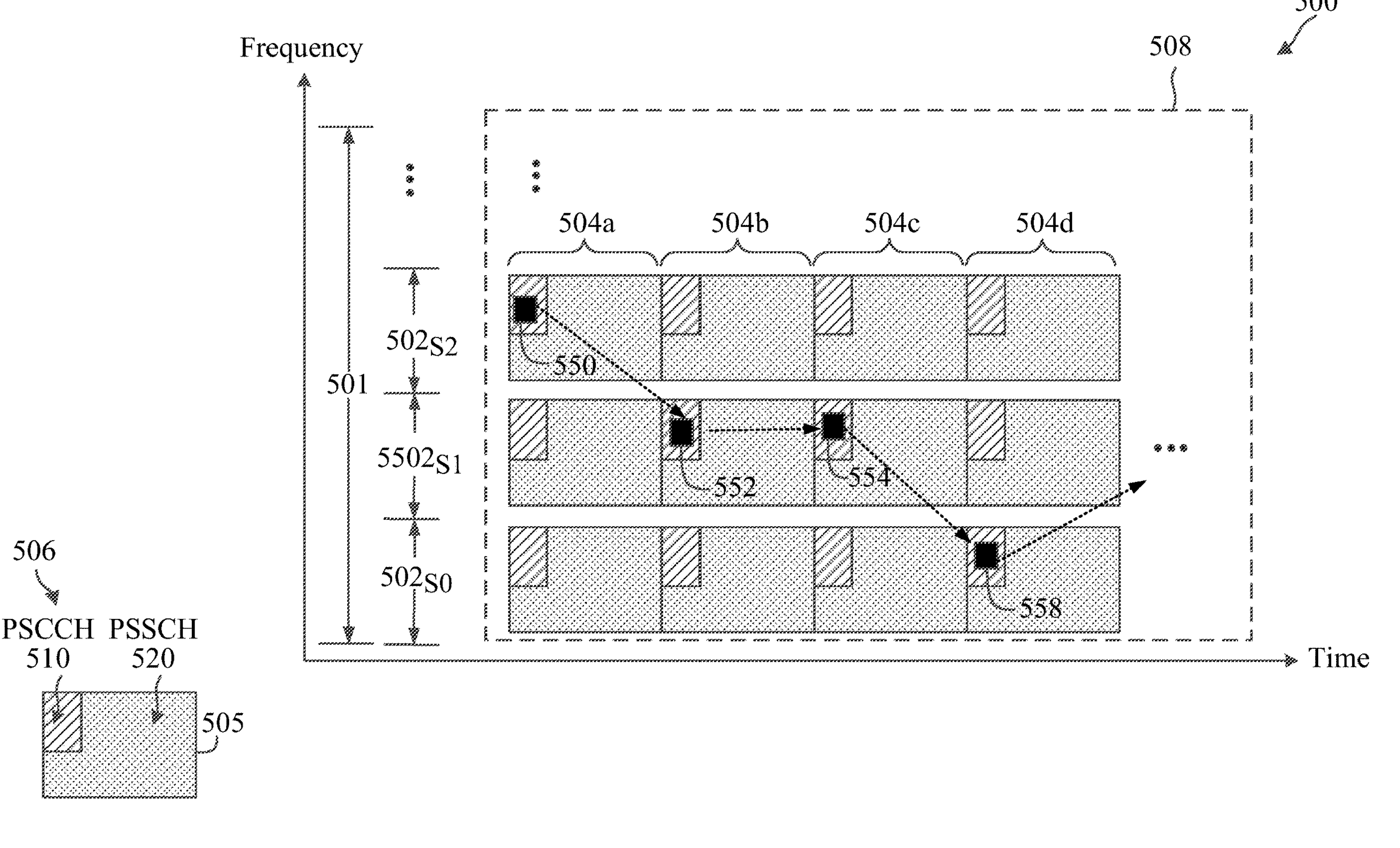
FIG. 5 is a graph illustrating a sidelink (SL) communications scheme, in accordance with various aspects of the present disclosure.

FIG. 5 is a graph illustrating a sidelink (SL) communications scheme, in accordance with various aspects of the present disclosure. A scheme 500 may be employed by UEs such as the UEs 104 in a network such as the network 100. In FIG. 5, the x-axis represents time and the y-axis represents frequency. In the scheme 500, a shared radio frequency band 501 is partitioned into multiple subchannels or frequency subbands 502 (shown as $\mathbf{502}_{S0}$, $\mathbf{502}_{S1}$, 502S2) in frequency and multiple sidelink frames 504 (shown as 504*a*, 504*b*, 504*c*, 504*d*) in time for sidelink communications. The frequency band 501 may be at any suitable frequencies. The frequency band 501 may have any suitable bandwidth (BW) and may be partitioned into any suitable number of frequency subbands 502. The number of frequency subbands 502 can be dependent on the sidelink communications BW requirement.

Each sidelink frame 504 includes a sidelink resource 505 in each frequency subband 502. A legend 506 indicates the types of sidelink channels within a sidelink resource 505. In some instances, a frequency gap or guard band may be specified between adjacent frequency subbands 502, for example, to mitigate adjacent band interference. The sidelink resource 505 may have a substantially similar structure as an NR sidelink resource. For instance, the sidelink resource 505 may include a number of subcarriers or RBs in frequency and a number of symbols in time. In some instances, the sidelink resource 505 may have a duration between about one millisecond (ms) to about 20 ms. Each sidelink resource 505 may include a PSCCH 510 and a PSSCH 520. The PSCCH 510 and the PSSCH 520 can be multiplexed in time and/or frequency. The PSCCH 510 may be for part one of a control channel (CCH), with the second part arriving as a part of the shared channel allocation. In the example of FIG. 5, for each sidelink resource 505, the PSCCH 510 is located during the beginning symbol(s) of the sidelink resource 505 and occupies a portion of a corresponding frequency subband 502, and the PSSCH 520 occupies the remaining time-frequency resources in the sidelink resource 505. In some instances, a sidelink resource 505 may also include a physical sidelink feedback channel (PSFCH), for example, located during the ending symbol(s) of the sidelink resource 505. In general, a PSCCH 510, a PSSCH 520, and/or a PSFCH may be multiplexed within a sidelink resource 505.

The PSCCH 510 may carry SCI 550 and/or sidelink data. The sidelink data can be of various forms and types depending on the sidelink application. For instance, when the sidelink application is a V2X application, the sidelink data may carry V2X data (e.g., vehicle location information, traveling speed and/or direction, vehicle sensing measurements, etc.). Alternatively, when the sidelink application is an IIoT application, the sidelink data may carry IIoT data (e.g., sensor measurements, device measurements, temperature readings, etc.). The PSFCH can be used for carrying feedback information, for example, hybrid automatic repeat request (HARQ) acknowledgment/negative acknowledgment (ACK/NACK) for sidelink data received in an earlier sidelink resource 505.

In an NR sidelink frame structure, the sidelink frames 504 in a resource pool 508 may be contiguous in time. A sidelink UE (e.g., the UEs 104) may include, in SCI 550, a reservation for a sidelink resource 505 in a later sidelink frame 504. Thus, another sidelink UE (e.g., a UE in the same NR-U sidelink system) may perform SCI sensing in the resource pool 508 to determine whether a sidelink resource 505 is available or occupied. For instance, if the sidelink UE detected SCI indicating a reservation for a sidelink resource 505, the sidelink UE may refrain from transmitting in the reserved sidelink resource 505. If the sidelink UE determines that there is no reservation detected for a sidelink resource 505, the sidelink UE may transmit in the sidelink resource 505. As such, SCI sensing can assist a UE in identifying a target frequency subband 502 to reserve for sidelink communications and to avoid intra-system collision with another sidelink UE in the NR sidelink system. In some aspects, the UE may be configured with a sensing window for SCI sensing or monitoring to reduce intra-system collision.

In some aspects, the sidelink UE may be configured with a frequency hopping pattern. In this regard, the sidelink UE may hop from one frequency subband 502 in one sidelink frame 504 to another frequency subband 502 in another sidelink frame 504. In the illustrated example of FIG. 5, during the sidelink frame 504*a*, the sidelink UE transmits SCI 550 in the sidelink resource 505 located in the frequency subband $\mathbf{502}_{S2}$ to reserve a sidelink resource 505 in a next sidelink frame 504*b* located at the frequency subband $\mathbf{502}_{S1}$. Similarly, during the sidelink frame 504*b*, the sidelink UE transmits SCI 552 in the sidelink resource 505 located in the frequency subband $\mathbf{502}_{S1}$ to reserve a sidelink resource 505 in a next sidelink frame 504*c* located at the frequency subband $\mathbf{502}_{S1}$. During the sidelink frame 504*c*, the sidelink UE transmits SCI 554 in the sidelink resource 505 located in the frequency subband $\mathbf{502}_{S1}$ to reserve a sidelink resource 505 in a next sidelink frame 504*d* located at the frequency subband $\mathbf{502}_{S0}$. During the sidelink frame 504*d*, the sidelink UE transmits SCI 558 in the sidelink resource 505 located in the frequency subband $\mathbf{502}_{S0}$. The SCI 558 may reserve a sidelink resource 505 in a later sidelink frame 504.

The SCI can also indicate scheduling information and/or a destination identifier (ID) identifying a target receiving sidelink UE for the next sidelink resource 505. Thus, a sidelink UE may monitor SCI transmitted by other sidelink UEs. Upon detecting SCI in a sidelink resource 505, the sidelink UE may determine whether the sidelink UE is the target receiver based on the destination ID. If the sidelink UE is the target receiver, the sidelink UE may proceed to receive and decode the sidelink data indicated by the SCI. In some aspects, multiple sidelink UEs may simultaneously communicate sidelink data in a sidelink frame 504 in different frequency subband (e.g., via frequency division multiplexing (FDM)). For instance, in the sidelink frame 504*b*, one pair of sidelink UEs may communicate sidelink data using a sidelink resource 505 in the frequency subband $\mathbf{502}_{S2}$ while another pair of sidelink UEs may communicate sidelink data using a sidelink resource 505 in the frequency subband $\mathbf{502}_{S1}$.

In some aspects, the scheme 500 is used for synchronous sidelink communications. That is, the sidelink UEs may be synchronized in time and are aligned in terms of symbol boundary, sidelink resource boundary (e.g., the starting time of sidelink frames 504). The sidelink UEs may perform synchronization in a variety of forms, for example, based on sidelink synchronization signal blocks (SSBs) received from a sidelink UE and/or NR-U SSBs received from a network node (e.g., the network node 102) while in-coverage of the network node. In some aspects, the sidelink UE may be preconfigured with the resource pool 508 in the frequency band 501, for example, while in coverage of a serving network node. The resource pool 508 may include a plurality of sidelink resources 505. The network node can configure the sidelink UE with a resource pool configuration indicating resources in the frequency band 501 and/or the frequency subbands 502 and/or timing information associated with the sidelink frames 504. In some aspects, the scheme 500 includes mode-2 RRA (e.g., supporting autonomous radio resource allocation (RRA) that can be used for out-of-coverage sidelink UEs or partial-coverage sidelink UEs).

In a wireless communication network, the term coverage generally refers to the geographical area where a device may receive a wireless signal from a network node. An in-coverage UE refers to a UE that is within the geographical area covered by the signal from the network node. The in-coverage UE may directly communicate with the network node. An out-of-coverage (OOC) UE (e.g., OOC sidelink (SL) UE) refers to a UE that is outside the geographical area where the network node's signal can reach. The OOC UE cannot directly communicate with the network node due to a lack of signal or a weak signal. For these devices, alternate methods of communication may be used to maintain connectivity, such as via relay nodes that forward signals between the network node and the OOC UE and/or via device-to-device (D2D) communication technologies, such as sidelink.

In SL mode 1, a network node (e.g., gNB) may retain some control over one or more SL UEs. In some examples, the network node may be limited to controlling in-coverage SL UEs. In such examples, the SL scheduling may be transmitted to one or more in-coverage SL UEs via downlink control information (DCI) (e.g., DCI 3_0). In some systems, SL mode 2 may be used for OOC SL UEs. In such systems, the OOC SL UEs may operate in a contention-based manner, potentially leading to inefficiencies or collisions. In some examples, an SL relay UE may be specified to relay communications between a network node and an OOC SL UE. In some examples, the SL relay UE may communicate with the network node via a cellular interface (e.g., Uu interface) and also communicate with one or more OOC SL UEs via a sidelink interface (e.g., PC-5 interface). Additionally, the SL relay UE may relay an SL grant for OOC UE sidelink communication. The relay UE may also relay a buffer status report (BSR), for uplink or SL communication, towards a network node, facilitating the network node's scheduling decisions.

Figure 6:
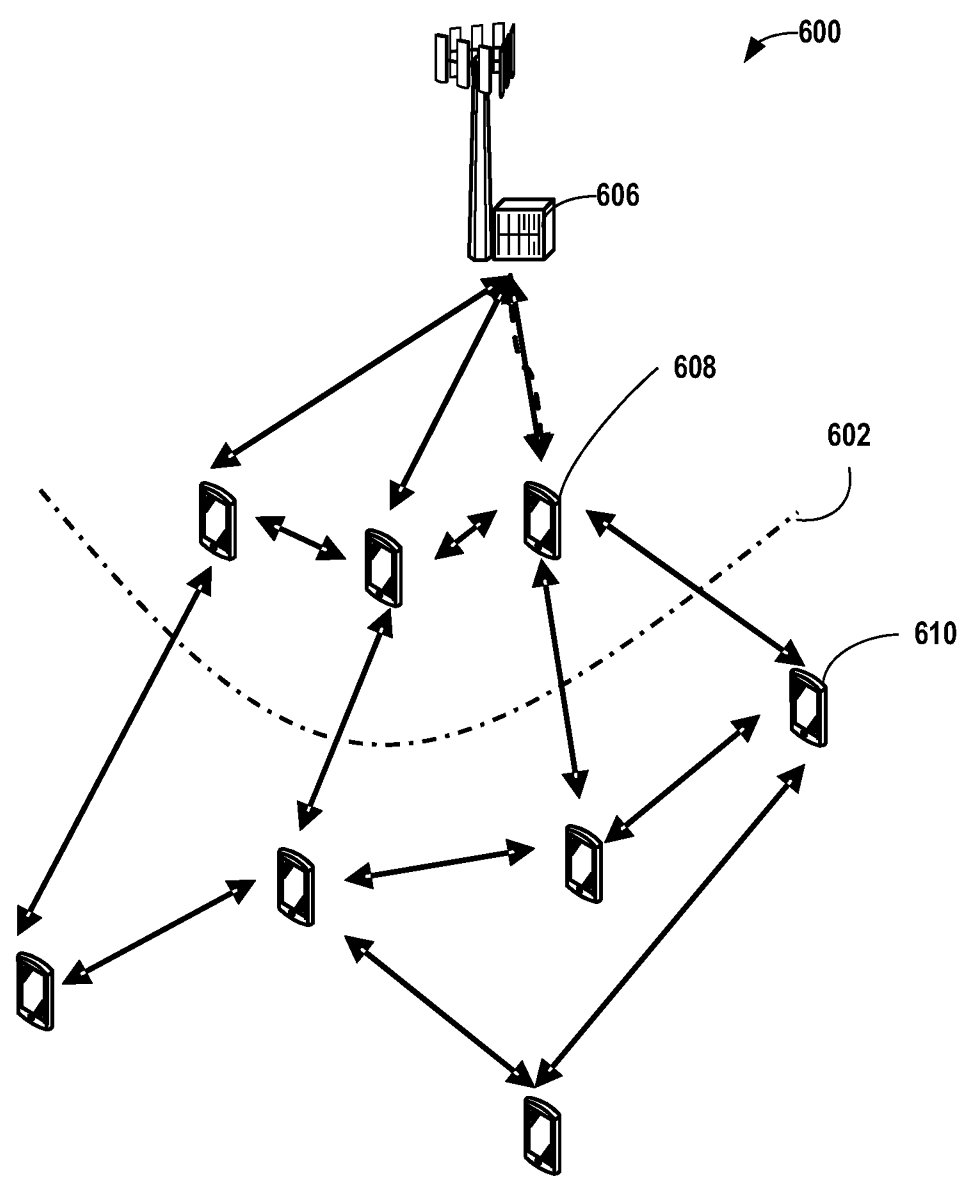
FIG. 6 is a diagram illustrating an example of a relay network, in accordance with various aspects of the present disclosure.

FIG. 6 is a diagram illustrating an example of a relay network 600, in accordance with various aspects of the present disclosure. In the example of FIG. 6, a first set of relay UEs 608 may be within a coverage area 602 associated with a network node 606. In some examples, each relay UE 608 may be a sidelink UE. Additionally, a second set of UEs 610 may be outside the coverage area 602. These UEs 610 may be examples of OOC SL UEs. For ease of explanation, only one of the first set of relay UEs 608 and one of the second set of UEs 610 is labeled in FIG. 6. Many relay networks include three types of nodes. The network node 606 may be an example of a base station 102 described with reference to FIGS. 1 and 2, or a base station 320 or 321 described with reference to FIG. 3. Each of relay UEs 608 and OOC SL UEs 610 may be an example of a UE 104 described with reference to FIGS. 1 and 2, or a UE 350, 351, or 352 described with reference to FIG. 3.

The network node 606 may directly communicate with the relay UEs 608 and indirectly communication with the OOC SL UEs 610. In some examples, the network node 606 may transmit layer 1 (L1) control signals toward the relay UEs 608. Each relay UE 608 may forward L1 signals from the network node 606 to one or more OOC SL UEs 610, while also relaying uplink and downlink traffic between the network node 606 and one or more OOC SL UEs 610. Each relay UE 608 may include specialized software layers to execute its relay functions. Each relay UE 608 may be a single-hop or multi-hop relay UE.

Figure 7:
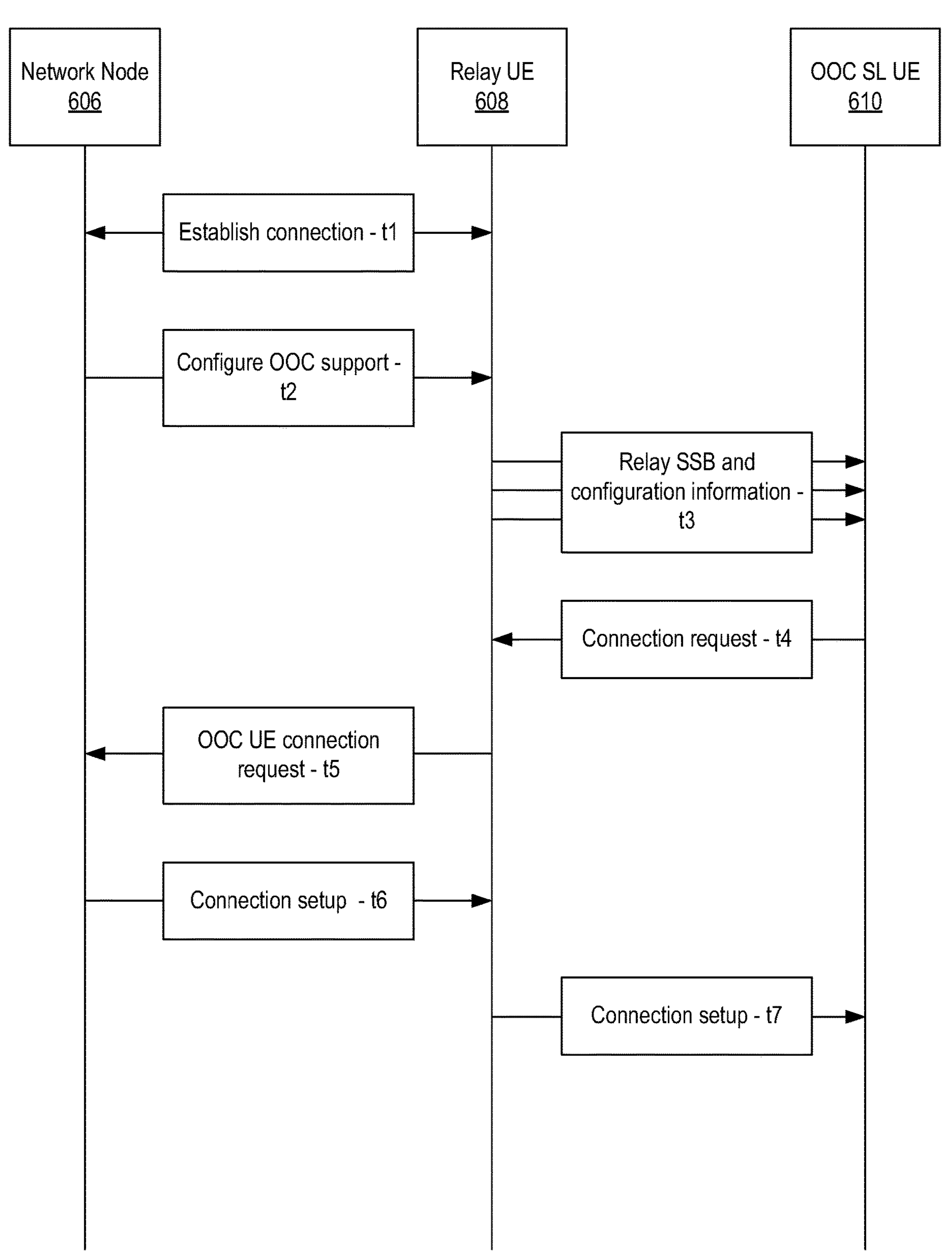
FIG. 7 is an example of a timing diagram illustrating an example of establishing a connection between a network node and an out-of-coverage (OOC) SL UE, via a relay UE, in accordance with various aspects of the present disclosure.

FIG. 7 is an example of a timing diagram illustrating an example of establishing a connection between a network node 606 and an OOC SL UE 610, via a relay UE 608, in accordance with various aspects of the present disclosure. As shown in the example of FIG. 7, at time t1, the network node 606 and the relay UE 608 establish a connection. In some examples, the connection may be a wireless connection via a wireless interface, such as a Uu interface. At time t2, the network node 606 transmits, to the relay UE 608, a message configuring the relay UE 608 to communicate with the OOC SL UE 610. The message may be an example of an OOC configuration support message. For example, the OOC configuration support message may include one or more parameters associated with a relay synchronization signal block (SSB). The OOC configuration support message may also instruct the relay UE 608 to transmit the relay SSB in accordance with the one or more parameters.

As shown in the example of FIG. 7, at time t3, the relay UE 608 may transmit the relay SSB and configuration information for a connection request, to the OOC SL UE 610. The relay UE 608 may transmit the relay SSB and the configuration information on one or more instances in accordance with receiving instructions, from the network node 606, to transmit the relay SSB in accordance with the one or more parameters. The configuration information may be included in a system information block (SIB) (e.g., SIB1). The transmission(s) of the relay SSB at time t3 may be an example of an SSB sweep. The relay SSB may be the same as an SSB associated with the network node 606.

Figure 8:
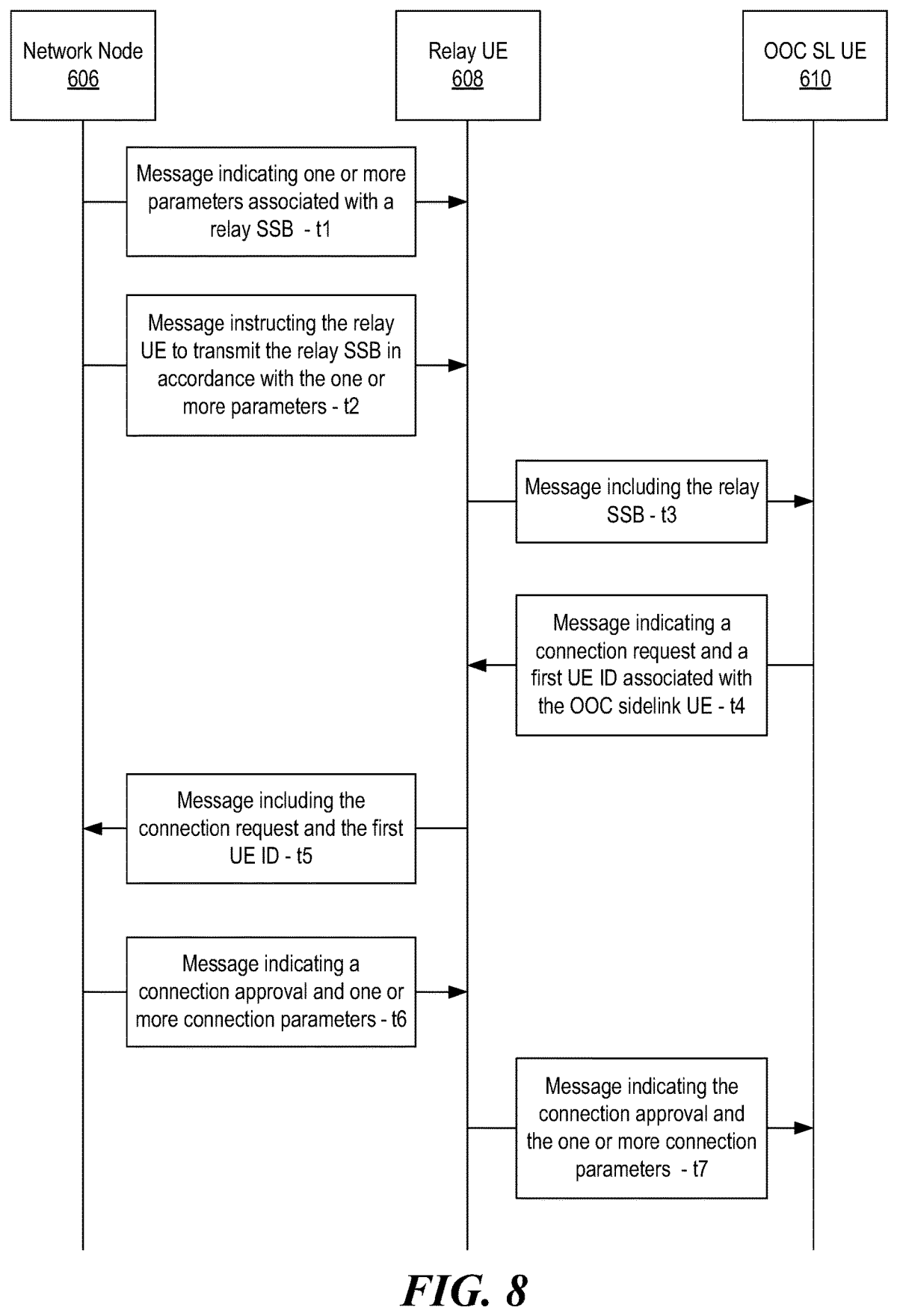

In some examples, the OOC SL UE 610 may search for the network node 606 in accordance with conventional wireless communication system behavior, such as Uu behavior. Upon determining the network node 606 is OOC, the OOC SL UE 610 may search for the relay UE 608. In some examples, the search process may be a unified search process, in which the OOC SL UE 610 searches for both the network node 606 and the relay UE 608. The OOC SL UE 610 may prioritize accessing the network node 606 over the relay UE 608 via SSB priority. In the example of FIG. 8, the OOC SL UE 610 may search for the relay UE 608, and optionally the network node 606, at times t3-t4.

As shown in the example of FIG. 7, at time t4, the relay UE 608 may receive, from the OOC SL UE 610, a connection request in accordance with transmitting the relay SSB and configuration information. At time t5, the relay UE 608 may forward the connection request to the network node 606. At time t6, the relay UE 608 may then receive, from the network node 606, a connection setup message in response to forwarding the connection request. The connection setup message may include configuration information for communicating with the network node 606. At time t6, the relay UE 608 may forward the connection setup message to the OOC SL UE 610. The relay connection may be established after the relay UE forwards the connection setup message to the OOC SL UE 610.

FIG. 8 is an example of a timing diagram illustrating an example of establishing a connection between a network node 606 and an OOC SL UE 610, via a relay UE 608, in accordance with various aspects of the present disclosure. In the example of FIG. 8, the network node 606 and the relay UE 608 may have previously established a connection, such as a connection via a wireless interface (e.g., Uu interface). At time t1, the network node 606 transmits, to the relay UE 608, a message indicating one or more parameters associated with a relay SSB. Additionally, at time t2, the relay UE 608 receives, from the network node 606, a message instructing the relay UE 608 to transmit the relay SSB in accordance with the one or more parameters. The relay UE 608 may transmit the relay SSB to extend the coverage of the network node 606.

In some examples, the one the one or more parameters include a relay pattern for the relay SSB. The relay pattern may be a same pattern as a network pattern associated with a network SSB (e.g., Uu SSB). In some such examples, a first offset and a first periodicity associated with the relay pattern are different than a second offset and a second periodicity associated with the network pattern. In new radio (NR) SL, the SSB pattern may differ from the network SSB pattern to cater to high-mobility use cases. However, various aspects of the present disclosure use a unified SSB pattern for both the sidelink and cellular (e.g., Uu) interfaces to simplify the searching implementation for the receiving UE, such as the OOC SL UE 610.

As shown in FIG. 8, at time t3, the relay UE 608 may transmit, to the OOC SL UE 610 via an SL channel, a message including the relay SSB. The relay UE 608 may transmit the relay SSB in accordance with receiving the instructions at time t2. In some examples, the relay UE 608 sweeps the relay SSB transmission at time t3. In such examples, relay UE 608 may transmit the relay SSB across different frequency ranges and/or time intervals to cover various portions of the spectrum.

In some examples, a non-relay UE may use an indication in a primary synchronization signal (PSS), secondary synchronization signal (SSS), or master information block (MIB), such as the OOC SL UE 610, or a multi-hop relay UE to determine whether an SSB originated from the network node 606 or the relay UE 608. In some such examples, for a multi-hop relay, the SSB may also include synchronization priority information to indicate which relay UE 608 is closer to the network node 606, facilitating a more efficient connection. A synchronization (e.g., sync) priority may be a function of a number of hops to the network node 606. Thus, in some examples, the relay UE 608 may transmit, to the OOC SL UE 610, a message indicating a synchronization priority via one or more of a PSS, SSS, or a physical sidelink broadcast channel (PSBCH). In some such examples, the synchronization priority may be indicated via PSS and/or SSS sequences reserved for relay SSBs with different priorities. In other examples, the synchronization priority may be indicated via an MIB field, a PSBCH payload, or PSBCH scrambling. In NR SL, sync priority may be derived from the detected sidelink synchronization signal (SLSS) ID. In various aspects of the present disclosure, in order to use a unified SSB pattern for both the Uu and SL interfaces, then the PSS/SSS sequences would need to be shared among the Uu and SL interfaces.

In some examples, an initial sidelink bandwidth part (SL-BWP) and resource pool may be established to facilitate initial message exchanges between the relay UE 608 and the OOC SL UE 610. In conventional NR SL systems, the SL-BWP and resource pool (RP) may be preconfigured for OOC UEs. Additionally, a TDD bitmap in the MIB indicates which physical slots are available for sidelink transmissions. In contrast, in various aspects of the present disclosure, the network node 606 may control the allocation of sidelink frequency domain resources. Therefore, in some examples, the relay UE 608 receives, from the network node 606, a message configuration, an initial SL BWP, and an SL resource pool. In such examples, the relay UE 608 may transmit, to the OOC SL UE 610, a message indicating the initial SL BWP and the SL resource pool. In some such examples, the message may be included in a relay MIB. Due to the limited size of the MIB payload, BWP and resource pool combinations may be indexed in a table-based manner. In other examples, a relay MIB system information (RMSI) may include the message. In such examples, the PBCH and MIB may be shared between the Uu and SL interfaces. Additionally, in such examples, control resource set (CORESET) 0 may be indicated when the message is included in the RMSI. Specifically, the SL MIB may indicate the configuration of CORESET 0 and search space 0, which schedules the SL RMSI transmission. The RMSI, or SIB1, may also include additional configuration information for an initial connection.

In some examples, the OOC SL UE 610 may actively scan to detect one or more SSBs to identify a suitable synchronization source, which could be either the relay UE 608 or the network node 606. The OOC SL UE 610 may select the synchronization source based on SSB priority and/or a preconfigured reference signal received power (RSRP) threshold for the SSB. In such examples, the OOC SL UE 610 may perform a comprehensive search for all the SSBs over-the-air (OTA) within the synchronization rasters, aiming to determine the synchronization source based on the SSB's RSRP and the priority level. In some examples, an RSRP threshold may be specified for each priority level. Additionally, the OOC SL UE 610 may only consider detected synchronization sources with an RSRP value exceeding the specified RSRP threshold. If the UE detects multiple synchronization sources within the same priority level, the source with the strongest RSRP may be selected. However, for synchronization sources of differing priority levels, the OOC SL UE 610 may select the source with the highest priority, assuming the source satisfies the RSRP threshold criteria.

As shown in the example of FIG. 8, at time t4, the relay UE 608 may receive, from the OOC SL UE 610, a message indicating a connection request and a first UE identifier (ID) associated with the OOC sidelink UE. The relay UE 608 may receive a connection request in accordance with transmitting the relay SSB at time t3. In some examples, the relay UE 608 may receive the connection request in accordance with the synchronization priority associated with the relay UE 608. As discussed, the synchronization priority may be indicated via a PSS, SSS, or PSBCH. Additionally, the message received at time t4 may also include SL capabilities of the OOC SL UE 610 and other parameters for an initial connection setup.

In some examples, the first UE ID may facilitate communications between the network node 606 and the OOC SL UE 610 via the relay UE 608. In some such examples, the first UE ID is a universal UE ID that is preconfigured at the OOC SL UE 610. The first UE ID may be unique to the OOC SL UE 610. In such examples, the network node 606 may assign, via the Uu interface, the first UE ID as a cell-radio network temporary identified (C-RNTI) by. In other examples, the OOC SL UE 610 selects a temporary ID as the first UE ID by. The network node 606 may later assign a unique ID in a connection setup message or connection approval message.

In a multi-hop relay scenario, the first UE ID may be embedded within the sidelink control information (SCI) or a medium access control (MAC)-control element (CE) (MAC-CE) associated with the message received at time t4. The relay UE 608 (e.g., multi-hop relay UE) may identify the location of the OOC UE without the need to decode an entire data packet. By identifying the first ID (e.g., OOC SL UE ID) from either the SCI or the MAC-CE, the relay UE 608 may keep track of a preceding SL relay or node from which the message originated. This identifying enables the relay UE 608 to establish a routing pathway for future messages targeted at the OOC SL UE 610. Subsequently, when the relay UE 608 receives a packet from the network node 606 intended for the OOC SL UE 610 that includes the first ID, the relay UE 608 may determine the next relay hop necessary for delivering the packet to its final OOC UE destination (e.g., the OOC SL UE 610).

As shown in the example of FIG. 8, at time t5, the relay UE 608 may forward, to the network node 606, a message including the connection request and the first UE ID. At time t6, the relay UE 608 may receive, from the network node 606, a message indicating a connection approval and one or more connection parameters in accordance with transmitting the message at time t5. The network node 606 assigns the one or more connection parameters a UE ID. Additionally, or alternatively, the one or more connection parameters may include one or more of an SL BWP, resource pool configuration, an RRC configuration, a physical channel configuration, or a CSI report configuration. In some examples, the relay UE 608 may receive, from the network node 606, control signaling (e.g., L1 signaling) indicating a second UE ID. In some examples, the second UE ID may be the same as the first UE ID received from the OOC SL UE 610 based on the UE ID being a universal UE ID. Alternatively, the second UE ID may be a temporary UE ID. In some examples, the second UE ID may be included in control information, such as DCI or control information included in a downlink shared channel. The relay UE 608 may use the second UE ID to route messages to the OOC SL UE 610.

At time t7, the relay UE 608 forwards, to the OOC SL UE 610, the message indicating the connection approval and the one or more connection parameters. The relay UE 608 may forward the message in accordance with the second UE ID included in the control signaling received from the network node 606. In some examples, for a multi-hop network, the message transmitted at time t7 may include the universal UE or temporary UE ID in the SCI. In some examples, the relay UE 608 may look up a session ID and L1 ID for the next hop or the OOC SL UE 610 based on the second UE ID received from the network node 606. For a multi-hop relay network, based on a routing function, the relay UE 608 may identify a best route for transmissions to the OOC SL UE 610 based on the second UE ID. In other examples, the relay UE 608 may update a temporary OOC UE ID (e.g., temporary first UE ID) with a new OOC UE ID assigned by the network node 606 in a routing table based on the connection setup message transmitted at time t7. Once the routing table is updated, future L1 signaling packets originating from the network node 606 and destined for the OOC SL UE 610 may include the newly assigned, permanent OOC UE ID.

Following the successful completion of the connection setup process, the OOC SL UE 610 may update its UE ID as well as its RRC configuration based on the setup message transmitted from the relay UE 608 at time t7. For example, the OOC SL UE 610 may be updated with a new SL-BWP and resource pool configuration, which may improve the use of frequency domain resources. Additionally, the setup message transmitted from the relay UE 608 at time t7 may include changes to the channel state information (CSI) report configuration, among other updates.

Figure 9:
FIG. 9 is a flow diagram illustrating an example of a process for establishing a relay connection with an OOC SL UE, in accordance with various aspects of the present disclosure.
Figure 9:
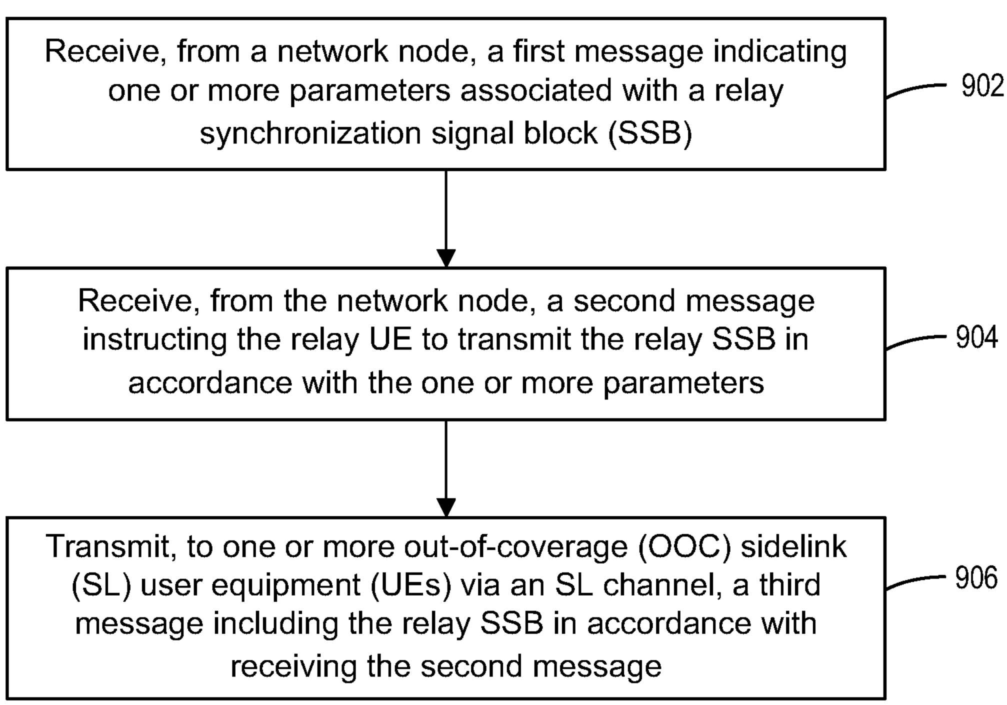

FIG. 9 is a flow diagram illustrating an example of a process 900 for establishing a relay connection with an OOC SL UE, in accordance with various aspects of the present disclosure. The process 900 may be performed by a relay UE working in conjunction with a network node. The network node may be an example of a base station 102 described with reference to FIGS. 1 and 2, a base station 320 or 321 described with reference to FIG. 3, or a network node 606 described with reference to FIGS. 6-8. The relay UE may be an example of a UE 103 described with reference to FIGS. 1 and 2, a UE 350, 351, or 352 described with reference to FIG. 3, or a relay UE 608 described with reference to FIGS. 6-8. The OOC SL UE may be an example of a UE 103 described with reference to FIGS. 1 and 2, a UE 350, 351, or 352 described with reference to FIG. 3, or an OOC SL UE 610 described with reference to FIGS. 6-8.

As shown in the example of FIG. 9, the process 900 begins at block 902 by receiving, from a network node, a first message indicating one or more parameters associated with a relay SSB. At block 904, the process 900 receives, from the network node, a second message instructing the relay UE to transmit the relay SSB in accordance with the one or more parameters. At block 906, the process 900 transmits, to one or more OOC SL UEs via an SL channel, a third message including the relay SSB in accordance with receiving the second message.

FIG. 1010 is a flow diagram illustrating an example of a process 1000 for establishing a relay connection with an OOC SL UE, in accordance with various aspects of the present disclosure. The process 1000 may be performed by a relay UE working in conjunction with a network node. The network node may be an example of a base station 102 described with reference to FIGS. 1 and 2, a base station 320 or 321 described with reference to FIG. 3, or a network node 606 described with reference to FIGS. 608. The relay UE may be an example of a UE 104 described with reference to FIGS. 1 and 2, a UE 350, 351, or 352 described with reference to FIG. 3, or a relay UE 608 described with reference to FIGS. 6-8. The OOC SL UE may be an example of a UE 104 described with reference to FIGS. 1 and 2, a UE 350, 351, or 352 described with reference to FIG. 3, or an OOC SL UE 610 described with reference to FIGS. 6-8.

As shown in the example of FIG. 10, the process 1000 begins at block 1002 by receiving, from an OOC SL UE via an SL channel, a first message indicating a connection request and a first UE ID associated with the OOC sidelink UE in accordance with transmitting a relay SSB. At block 1004, the process 1000 transmits, to a network node, a second message including the connection request and the first UE ID to enable the network node to control the OOC SL UE. At block 1006, the process 1000 receives, from the network node, a third message indicating a connection approval and one or more connection parameters in accordance with transmitting the second message. At block 1008, the process 1000 transmits, to the OOC SL UE via the SL channel, a fourth message indicating the connection approval and the one or more connection parameters in accordance with receiving the third message.

Implementation examples are described in the following numbered clauses:

Clause 1. A method for wireless communication at a relay user equipment (UE), comprising: receiving, from a network node, a first message indicating one or more parameters associated with a relay synchronization signal block (SSB); receiving, from the network node, a second message instructing the relay UE to transmit the relay SSB in accordance with the one or more parameters; and transmitting, to one or more out-of-coverage (OOC) sidelink (SL) UEs via an SL channel, a third message including the relay SSB in accordance with receiving the second message.

Clause 2. The method of Clause 1, wherein: the one or more parameters include a relay pattern for the relay SSB; the relay pattern is a same pattern as a network pattern associated with a network SSB; and a first offset and a first periodicity associated with the relay pattern is different than a second offset and a second periodicity associated with the network pattern.

Clause 3. The method of any one of Clauses 1-2, wherein: the one or more parameters are SSB parameters; and the UE transmits the relay SSB to extend a coverage area associated with the network node.

Clause 4. The method of any one of Clauses 1-3, further comprising transmitting, to the one or more OOC sidelink UEs, a fourth message indicating a synchronization priority via at least one of: a primary synchronization signal (PSS), a secondary synchronization signal (SSS), or a physical sidelink broadcast channel (PSBCH).

Clause 5. The method of Clause 4, further comprising receiving, from an OOC sidelink UE of the one or more OOC sidelink UEs, a fifth message indicating a connection request in accordance with indicating the synchronization priority.

Clause 6. The method of any one of Clauses 1-5, further comprising receiving, from the network node, a fourth message configuring an initial SL bandwidth part (BWP) and an SL resource pool for establishing the SL channel with the one or more OOC SL UEs.

Clause 7. The method of Clause 6, further comprising transmitting, to the one or more OOC SL UEs, a fifth message indicating the initial SL BWP and the SL resource pool for establishing the SL channel with the relay UE, wherein the fifth message is included in a relay master information block (MIB) or relay MIB system information (RMSI).

Clause 8. A method for wireless communication at a relay user equipment (UE), comprising: receiving, from an out-of-coverage (OOC) sidelink (SL) UE via an SL channel, a first message indicating a connection request and a first UE identifier (ID) associated with the OOC sidelink UE in accordance with transmitting a relay synchronization signal block (SSB); transmitting, to a network node, a second message including the connection request and the first UE ID to enable the network node to control the OOC SL UE; receiving, from the network node, a third message indicating a connection approval and one or more connection parameters in accordance with transmitting the second message; and transmitting, to the OOC SL UE via the SL channel, a fourth message indicating the connection approval and the one or more connection parameters in accordance with receiving the third message.

Clause 9. The method of Clause 8, further comprising receiving, from the network node, control information indicating a second UE ID, wherein: the first UE ID is pre-configured at the OOC SL UE; and the second UE ID is the same as the first UE ID.

Clause 10. The method of Clause 9, wherein the relay UE identifies the OOC SL UE as an intended recipient of the fourth message in accordance with receiving the second UE ID.

Clause 11. The method of Clause 8, wherein: the first UE ID is a temporary UE ID; the third message indicates a second UE ID that is different than the first UE ID; and the fourth message assigns the second UE ID to the OOC SL UE.

Clause 12. The method of Clause 11, further comprising updating a routing table to include the second UE ID in accordance with receiving the third message.

Clause 13. The method of any one of Clauses 8-12, wherein the first UE ID is included in sidelink control information (SCI) or a medium access control (MAC)-control element (CE) associated with the first message.

Clause 14. The method of any one of Clauses 8-13, wherein the one or more connection parameters include an SL bandwidth part (BWP), a resource pool configuration, a physical channel configuration, a channel state information (CSI) report configuration, and/or a radio resource control (RRC) configuration.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method for wireless communication at a relay user equipment (UE), comprising:

receiving, from a network node, a first message indicating one or more parameters associated with a relay synchronization signal block (SSB), wherein the one or more parameters include a relay pattern for the relay SSB, wherein the relay pattern is a same pattern as a network pattern associated with a network SSB, and wherein a first offset and a first periodicity associated with the relay pattern is different than a second offset and a second periodicity associated with the network pattern;

receiving, from the network node, a second message instructing the relay UE to transmit the relay SSB in accordance with the one or more parameters; and transmitting, to one or more out-of-coverage (OOC) sidelink (SL) UEs via an SL channel, a third message including the relay SSB in accordance with receiving the second message.

2. The method of claim 1, wherein:

the one or more parameters are SSB parameters; and the UE transmits the relay SSB to extend a coverage area associated with the network node.

3. The method of claim 1, further comprising transmitting, to the one or more OOC sidelink UEs, a fourth message indicating a synchronization priority via at least one of: a primary synchronization signal (PSS), a secondary synchronization signal (SSS), or a physical sidelink broadcast channel (PSBCH).

4. The method of claim 3, further comprising receiving, from an OOC sidelink UE of the one or more OOC sidelink UEs, a fifth message indicating a connection request in accordance with indicating the synchronization priority.

5. The method of claim 1, further comprising receiving, from the network node, a fourth message configuring an initial SL bandwidth part (BWP) and an SL resource pool for establishing the SL channel with the one or more OOC SL UEs.

6. The method of claim 5, further comprising transmitting, to the one or more OOC SL UEs, a fifth message indicating the initial SL BWP and the SL resource pool for establishing the SL channel with the relay UE, wherein the fifth message is included in a relay master information block (MIB) or relay MIB system information (RMSI).

7. A relay user equipment (UE), comprising:

one or more processors; and one or more memories coupled with the one or more processors and storing processor-executable code that, when executed by the one or more processors, is configured to cause the relay UE to:

receive, from a network node, a first message indicating one or more parameters associated with a relay synchronization signal block (SSB), wherein the one or more parameters include a relay pattern for the relay SSB, wherein the relay pattern is a same pattern as a network pattern associated with a network SSB, and wherein a first offset and a first periodicity associated with the relay pattern is different than a second offset and a second periodicity associated with the network pattern;

receive, from the network node, a second message instructing the relay UE to transmit the relay SSB in accordance with the one or more parameters; and transmit, to one or more out-of-coverage (OOC) sidelink (SL) UEs via an SL channel, a third message including the relay SSB in accordance with receiving the second message.

8. The relay UE of claim 7, wherein:

the one or more parameters are SSB parameters; and the UE transmits the relay SSB to extend a coverage area associated with the network node.

9. The relay UE of claim 7, wherein execution of the processor-executable code causes the relay UE to transmit, to the one or more OOC sidelink UEs, a fourth message indicating a synchronization priority via at least one of: a primary synchronization signal (PSS), a secondary synchronization signal (SSS), or a physical sidelink broadcast channel (PSBCH).

10. The relay UE of claim 9, wherein execution of the processor-executable code causes the relay UE to receive, from an OOC sidelink UE of the one or more OOC sidelink UEs, a fifth message indicating a connection request in accordance with indicating the synchronization priority.

11. The relay UE of claim 7, wherein execution of the processor-executable code causes the relay UE to receive, from the network node, a fourth message configuring an initial SL bandwidth part (BWP) and an SL resource pool for establishing the SL channel with the one or more OOC SL UEs.

12. The relay UE of claim 11, wherein execution of the processor-executable code causes the relay UE to transmit, to the one or more OOC SL UEs, a fifth message indicating the initial SL BWP and the SL resource pool for establishing the SL channel with the relay UE, wherein the fifth message is included in a relay master information block (MIB) or relay MIB system information (RMSI).

* * * * *